No. 830,595. PATENTED SEPT. 11, 1906.
G. W. JONES.
NUT LOCK.
APPLICATION FILED JAN. 18, 1906.
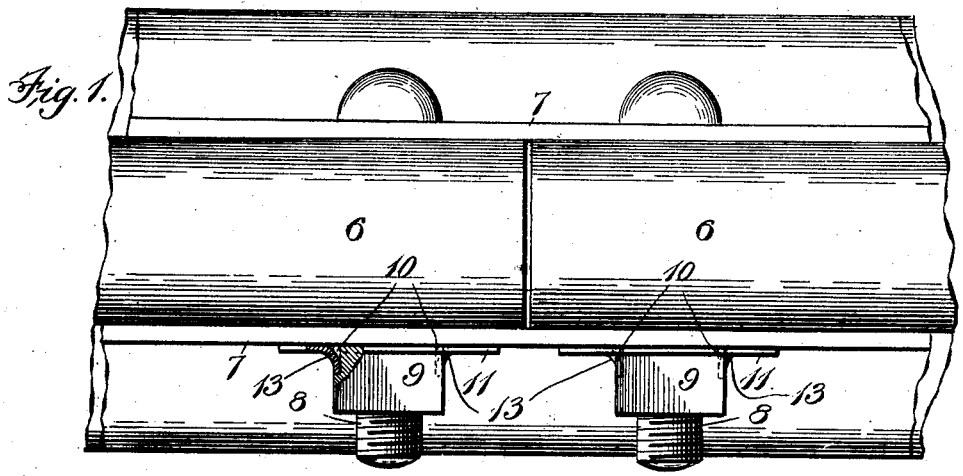
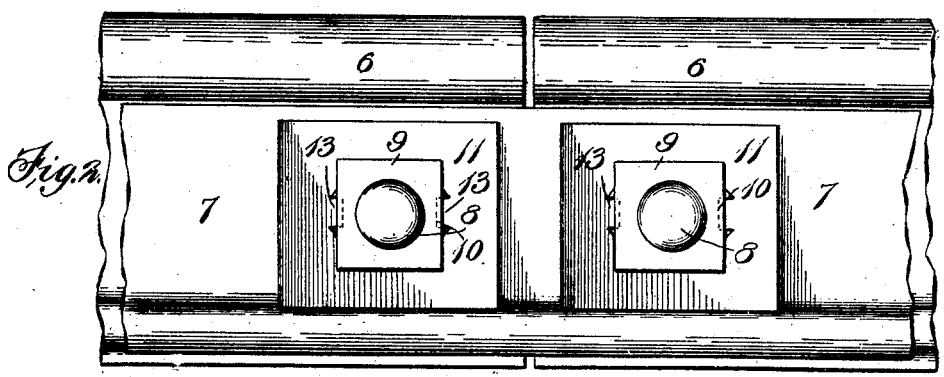
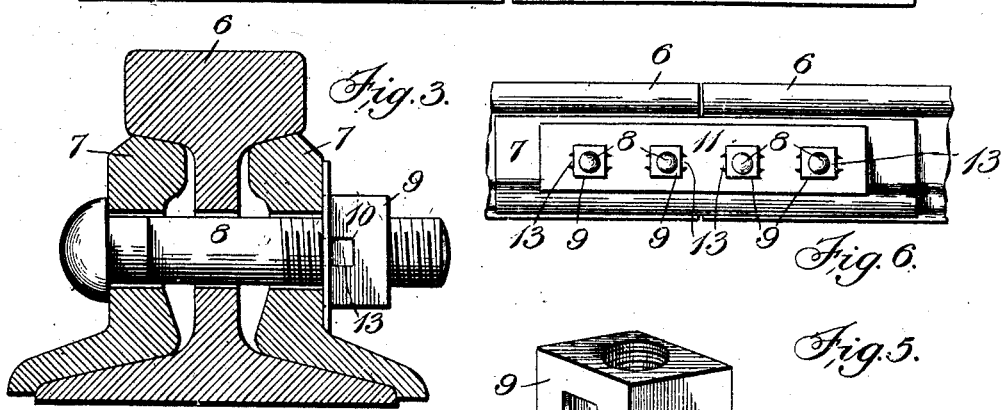
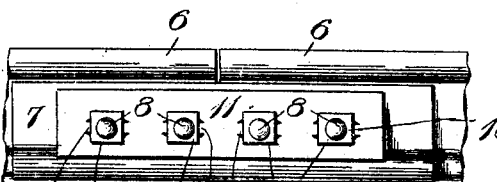
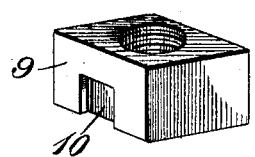
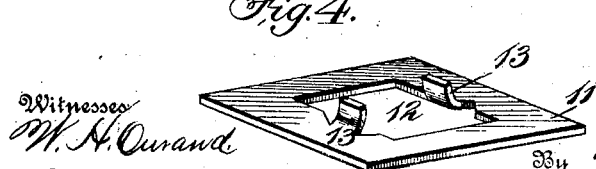
Witnesses
W. H. Durand
G. E. Few
Inventor
George W. Jones
By Milo B. Stevens & Co.
Attorneys

UNITED STATES PATENT OFFICE.

GEORGE WALLACE JONES, OF GATE CITY, ALABAMA.

NUT-LOCK.

No. 830,595.    Specification of Letters Patent.    Patented Sept. 11, 1906.

Application filed January 18, 1906. Serial No. 296,624.

*To all whom it may concern:*

Be it known that I, GEORGE WALLACE JONES, a citizen of the United States, residing at Gate City, in the county of Jefferson and State of Alabama, have invented new and useful Improvements in Nut-Locks, of which the following is a specification.

This invention is a nut-lock, and has for its object to provide an improved and simple device for locking the nut on a bolt.

It is particularly useful in connection with bolts used to fasten railway fish-plates and is so illustrated in the accompanying drawings.

In the drawings, Figure 1 is a plan view of the invention applied to rails and fish-plates. Fig. 2 is a side elevation thereof. Fig. 3 is a vertical cross-section. Fig. 4 is a perspective view of the locking device detached. Fig. 5 is a perspective view of the nut to which said locking device is applied. Fig. 6 is a side elevation of a modified form in which the locking-plate is applied to a plurality of nuts.

Referring specifically to the drawings, 6 indicates the meeting ends of two rails, and 7 the fish-plates thereon. These are fastened together by bolts 8 having nuts 9. Each nut has in opposite sides thereof adjacent its lower edge a notch or recess 10. The locking device for the nut consists of a piece of soft spring-steel or flexible iron (indicated at 11) preferably rectangular in shape or having at least one straight edge. This plate has a central recess 12 of proper size and shape to fit over the nut and on opposite sides of the recess has spring-tongues 13 struck up from the plate. These tongues are of proper size and shape to fit in the notches 10, which are of less width than the side of the nut, so that the edges of the notches come against the edges of the tongues and so oppose the turn of the nut to a greater extent than if the tongue merely pressed against the side of the nut.

In use the nut is tightened against the fish-plate until it sets square with the rail—that is, with its lower side parallel to the lower edge of the fish-plate or the base of the rail and with the notches 10 at the sides. The plate 11 is then applied and put on over the nut, the tongues 13 yielding to allow this action. When the plate reaches the fish-plate, the tongues 13 spring into the notches, and therefore prevent the nuts from turning unless the plate is also turned; but the plate is of such size that its lower edge fits against the base or flange of the fish-plate, and so cannot turn. The nut is thus locked against rotation and cannot be unscrewed without prying the tongues out of the notches and removing the plate.

In Fig. 6 a modified form is shown in which the plate is made long enough to cover a plurality of bolts, a hole being provided for each bolt and tongues at each hole to engage the nuts in the same manner as above indicated.

Although illustrated in connection with a rail-joint, the invention is not confined thereto, but may, for example, be used on frogs, crossings, bridge-bolts, and the like.

I claim—

In a nut-lock, the combination with a nut having a notch in the side thereof at its inner edge, said notch being of less width than the side of the nut, producing opposite shoulders at the sides, of a plate having an opening the same size as the nut, in which the nut fits with its sides against the edge of the opening, to prevent turning of the nut, and a spring-tongue at the edge of said opening engaging the notch, the tongue being of less width than the width of the opening and engaging the shoulders of the notch at its side edges.

In testimony whereof I have signed my name to this specification in the presence of two subscribing witnesses.

GEORGE WALLACE JONES.

Witnesses:
JAS. DANIEL MCCOOL,
FREDRICK BRUCHER.